United States Patent [19]

Arnold

[11] 3,711,123
[45] Jan. 16, 1973

[54] APPARATUS FOR PRESSURE TESTING ANNULAR SEALS IN AN OVERSLIDING CONNECTOR

[75] Inventor: James F. Arnold, Baytown, Tex.

[73] Assignee: HydroTech Services, Inc., Houston, Tex.

[22] Filed: Jan. 15, 1971

[21] Appl. No.: 106,856

[52] U.S. Cl. ..................285/18, 285/93, 285/96, 285/145, 285/342
[51] Int. Cl. ...............................................F16l 35/00
[58] Field of Search......285/18, 24, 27, 93, 101, 105, 285/165, 298, 302, 308, 322, 323, 373, 419, 421, 348, 343, DIG. 21, 294, 297, 145, 96, 342; 166/06; 277/2

[56] References Cited

UNITED STATES PATENTS

| | | | |
|---|---|---|---|
| 2,531,596 | 11/1950 | Allen et al. | 285/93 X |
| 3,097,866 | 7/1963 | Iversen | 285/18 |
| 3,393,926 | 7/1968 | Arnold | 285/18 |
| 2,350,867 | 6/1944 | Bean et al. | 285/93 X |
| 2,617,485 | 11/1952 | Thatch | 285/93 X |
| 2,620,880 | 12/1952 | Mueller et al. | 285/93 X |
| 2,733,939 | 2/1956 | Scherer | 285/372 X |
| 3,598,429 | 6/1971 | Arnold | 285/18 |

FOREIGN PATENTS OR APPLICATIONS 759,387   10/1956   Great Britain..........................285/93

Primary Examiner—Dave W. Arola
Attorney—Paul E. Harris, Lee R. Larkin and Marcus L. Thompson

[57] ABSTRACT

A connector housing having axially spaced apart radially deformable annular seals is slidably positioned over the end of a pipe and the seals are actuated by an hydraulically generated force into sealing engagement between the housing and the pipe. A pressurized fluid is then introduced into the housing between the seals to test the sealing engagement thereof.

1 Claim, 3 Drawing Figures

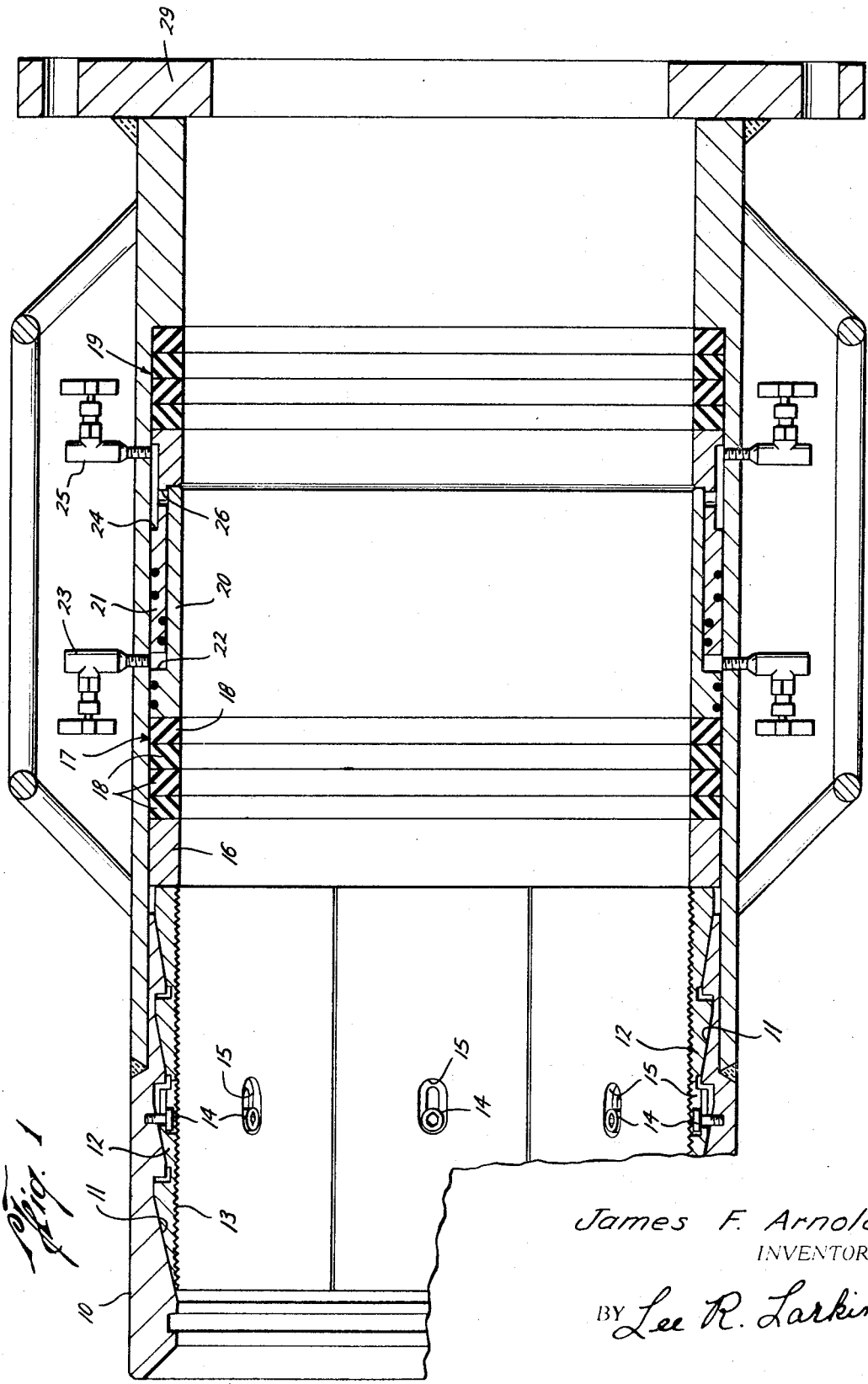

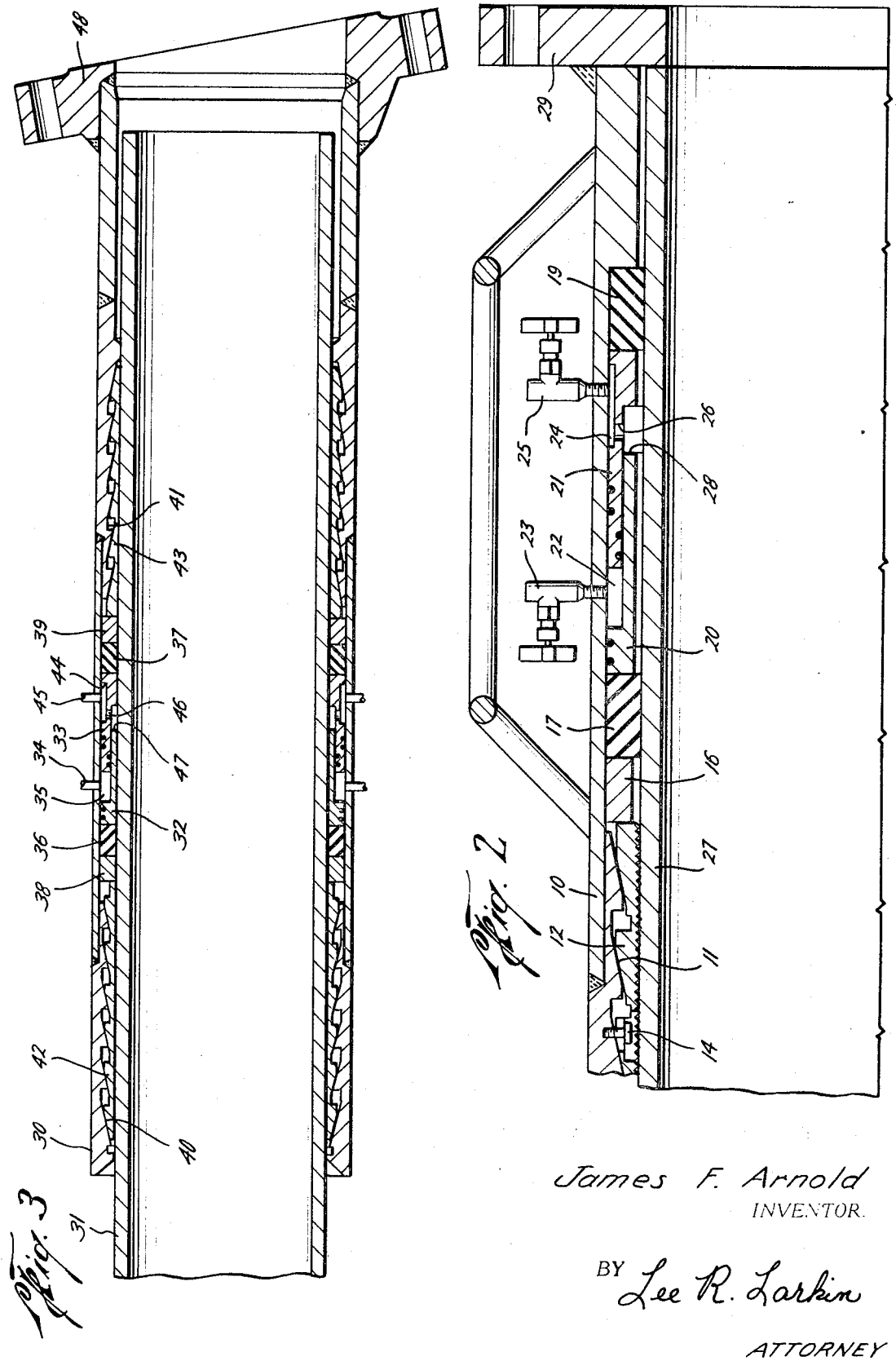

APPARATUS FOR PRESSURE TESTING ANNULAR SEALS IN AN OVERSLIDING CONNECTOR

BACKGROUND OF THE INVENTION

1. Field of the Invention

Apparatus and method for pressure testing the engagement of axially spaced apart annular seals positioned between a connector housing and a pipe.

2. Description of the Prior Art

The construction and repair of pipelines, drilling platforms and other structures formed of tubular members is conventionally accomplished by overlap or butt welding the ends of the tubular members. Mechanically and hydraulically actuated couplings and connections for tubular members have been offered by the prior art for use in hostile environments, such as underwater, and for use where welding would be unduly hazardous or time consuming. An example of the latter is described in Arnold U. S. Pat. No. 3,393,926.

Regardless of whether connection is made by welding or by the use of mechanical or hydraulically actuated connectors, the standard method of pressure testing the connection is to pressurize the tubular member and inspect the connection for leaks. When a leak is discovered the tubular member usually must be depressurized before the connection can be re-established. This can be time consuming, expensive and dangerous. No known connectors or connection methods are available in the prior art which allow pressure testing of such a connection prior to pressurizing the connected members.

SUMMARY OF THE INVENTION

It is therefore an object of this invention to provide an improved coupling and method of joining a tubular member to another member, the seal of which coupling may be pressure tested prior to pressurization of the tubular member.

This invention includes an apparatus and method for testing the sealing engagement established between a tubular member and an overfitting connector. The apparatus includes a housing arranged for coaxial oversliding positioning over the end of a pipe and means for providing first and second axially spaced apart annular seals between the housing and the pipe. The seal means are arranged to be radially deformable into sealing engagement with the pipe upon actuation. Means are provided in the housing for gripping the external surface of the pipe upon actuation thereof; and, other means are provided for actuating the seal means and the gripping means. Finally, means are provided for introducing a pressurized fluid into the housing between the first and second seal means after the seal means have been actuated to the sealing position. This latter feature allows the engagement of the seal means to be pressure tested without having to pressurize the pipe.

If desired, the pressurizing fluid may be a hardenable liquid such as an epoxy resin which will harden to provide a backup to the deformable seal means.

The actuating means for the seal means and the gripping means preferably includes piston means carried by the housing and arranged to move axially in response to an hydraulic pressure exerted thereagainst.

The method of this invention for connecting a tubular member to another member includes slidably positioning over the end of the tubular member a housing having axially spaced apart annular seals which are radially deformable into sealing engagement between the housing and the pipe. The annular seals are then actuated into sealing engagement and a pressurized fluid is injected into the housing between the seals to test the sealing engagement thereof. If the pressurized fluid is a hardenable liquid, such as epoxy resin, a pressure is maintained on that liquid until it hardens.

The housing may be provided with a gripping element arranged for actuation into engagement with the tubular member, in which event the method of this invention then includes actuation of the gripping element by transmitting thereto an hydraulically generated force. Preferably seal actuation and gripping element actuation occur substantially simultaneously in response to the same hydraulically generated force.

BRIEF DESCRIPTION OF THE DRAWINGS

FIG. 1 is a side elevation view, partly in section, of a first embodiment of the apparatus of this invention.

FIG. 2 is a partial side elevation view similar to FIG. 1 but additionally showing the apparatus actuated into sealing engagement with a pipe positioned therein.

FIG. 3 is a side elevation view, partly in section, showing a second embodiment of the apparatus of this invention.

DESCRIPTION OF THE PREFERRED EMBODIMENT

Referring to the drawings and particularly to FIG. 1, one embodiment of the apparatus of this invention presently preferred by the inventor includes a generally cylindrical housing 10 arranged to be slidingly positioned over the end of a pipe (not shown), to which connection is to be made.

The left hand portion of housing 10, as viewed in FIG. 1, is provided with gripping means arranged for actuation into engagement between housing 10 and a pipe positioned therein. This gripping means includes a circumferential multiple surfaced tapered bowl 11 formed on the inside surface of housing 10, with mating segmented slip assembly 12 slidably positioned therein. The radially inward surface of slips 12 is provided with circumferential serrations or wickers 13 arranged to engage the external surface of a pipe inserted therein.

Slips 12 are retained in the circumferential position shown in FIG. 1 by retainer cap screws 14 which are inserted through counterbored slots 15 into housing 10. Slips 12 perform in the conventional manner and move radially inward when a leftward axial force is exerted upon the right end thereof (as viewed in FIGS. 1 and 2). An annular thrust ring 16 is provided adjacent the right end of slips 12 and provides means for transmitting generally equal actuation forces to each of slips 12. Ring 16 also acts as a backup for one annular seal of this apparatus, as described below.

Means for creating a first annular seal between housing 10 and a pipe inserted therein is provided in the form of generally cylindrical seal 17 which is carried by housing 10 adjacent the right end of ring 16. Seal 17 is formed of deformable material such as neoprene rubber which will expand radially when subjected to an axially compressive force. Seal 17 may be formed in a single cylindrical ring or may be formed as shown from a plurality of parallel adjacent packing rings 18.

Similarly, seal 17 could assume other convenient shapes as long as it is arranged to be deformed radially into sealing engagement between housing 10 and pipe therein.

The right end portion of housing 10, as viewed in FIG. 1, is provided with a second similar annular seal 19 which is axially spaced from seal 18 and which similarly may assume any desired radially deformable configuration.

Coaxially slidably positioned within housing 10 between seals 17 and 19 is an inside annular piston 20 and a telescopingly mating outside annular piston 21. In FIG. 1 pistons 20 and 21 are illustrated in the minimum axial extension position and exert little or no axial force upon seals 17 and 19.

The radially outward adjacent portions of pistons 20 and 21 cooperate with housing 10 to form an hydraulic fluid chamber 22. When a pressurized hydraulic fluid is introduced into chamber 22 through inlet valve 23, pistons 20 and 21 respond to that pressure and telescope axially outward and thereby exert an axial deforming force upon seals 17 and 19. The leftward axial force exerted upon seal 17 is transmitted substantially simultaneously by ring 16 to slips 12.

Outer piston 21 is provided with an annular chamber 24 about the right end portion thereof, which chamber is accessible from the outside of housing 10 through pressurizing fluid inlet valve 25. Piston 21 has a plurality of circumferentially spaced radial openings 26 therethrough arranged to communicate pressurized fluid from chamber 24 into the space formed between a pipe positioned in housing 10, seals 17 and 19, and pistons 20 and 21, as described below.

Referring to FIG. 2, an apparatus such as that described above is shown in partial cross section with a pipe 27 inserted therein. In operation the apparatus is slidably positioned over the end of a tubular member such as pipe 27 shown in FIG. 2. An hydraulic fluid is then introduced into chamber 22 through valve 23 causing telescoping axially opposed movement between pistons 20 and 21. Leftward movement of piston 20 causes the left end thereof to exert an axial force upon seal 17. This force is transmitted through seal 17 and ring 16 to slips 12 causing slips 12 to move into gripping engagement with pipe 27. As slips 12 become set, a continued axial force from piston 20 will cause axial compression of seal 17 between ring 16 and piston 20. Seal 17 will then deform radially into annular sealing engagement between housing 10 and the external surface of pipe 27.

While piston 20 is moving leftward, as viewed in FIG. 2, piston 21 will move rightward and will exert an axially compressive force upon seal 19. Seal 19 will thereby become radially deformed into sealing engagement between housing 10 and pipe 27.

Actuation of this apparatus by an hydraulic pressure in chamber 22, as described above, will simultaneously cause another annular chamber 28 to be formed between the radially inward right end of piston 20 and the lower surface of piston 21 adjacent radial openings 26 in piston 21. With the apparatus so actuated, a pressurized fluid may be introduced through valve 25, chamber 24, and openings 26 into chamber 28. This fluid will then flow from chamber 28 between pipe 27 and the radially inward surfaces of pistons 20 and 21 to contact with seals 17 and 19. If seals 17 and 19 are deformed properly into sealing engagement with pipe 27 there will be no further flow of the pressurized fluid and the pressure of this fluid will not be lost. If a seal leak is discovered, as for example by noting a reduction in the pressure of the pressurization fluid or by a flow of the pressurization fluid around pipe 27 at either end of housing 10, an hydraulic pressure can be reintroduced through valve 23 into chamber 22 to reset the apparatus and a pressure test again made.

As it will be observed, this seal pressure testing may be accomplished without having to enclose either end of pipe 27 and without having to pressurize the inside thereof.

The pressurization fluid which is introduced through valve 25 to test the engagement of seals 16 and 17 may be either a gas or a liquid, and, when using this apparatus to connect underwater pipes, this fluid conveniently can be water. If it is desired to create a permanent non-yielding connection, a hardenable liquid such as epoxy resin may be used as the test fluid. In the alternative, the seals may be tested with any convenient fluid, as described above, and that fluid subsequently may be purged and replaced with a hardenable liquid. When such a hardenable liquid is used, it additionally provides the benefit of acting as a backup to seals 17 and 19 to prevent axially inward flow thereof with aging, and provides a further seal between pipe 27 and housing 10.

Housing 10 may be connected to any other desired member, as for example to another such connector, through the use of any desired means, such as flange 29 illustrated in FIG. 2.

Referring now to FIG. 3, a second embodiment of the apparatus of this invention is shown in partial cross section and includes a housing 30 which is slidably positioned on the end of pipe 31.

This apparatus is similar in construction and operation to that described above and includes a pair of annular telescoping pistons 32 and 33 arranged to exert opposed axial forces in response to the introduction of an hydraulic fluid through line 34 into chamber 35 formed therebetween.

Deformable annular seals 36 and 37 are positioned in housing 30 adjacent the axially outward ends of pistons 32 and 33, respectively, and are arranged to deform radially when subjected to an axial force, as described above with reference to the seals shown in FIGS. 1 and 2.

Adjacent the axially outward ends of seals 36 and 37 there are provided thrust rings 38 and 39, respectively, which function as a back-up to seals 36 and 37 and which also act to distribute the axial force from pistons 32 and 33 to gripping means adjacent thereto, as described below.

Formed on the radially inward surface of housing 30 at each end thereof are multiple surfaced tapered bowls 40 and 41 which have multiple surfaced tapered slips 42 and 43, respectively, slidably positioned therein. These slips and bowls provide a means for gripping the external surface of pipe 31 to prevent movement of housing 30 relative to pipe 31 which movement otherwise might be occasioned by tension or compression forces arising in pipe 31.

Referring to the center of housing 30 as shown in FIG. 3, piston 33 is provided with an annular chamber 44 thereabout to which a pressurized fluid may be introduced through line 45. A fluid in chamber 44 is allowed to pass through circumferentially spaced radial openings 46 in piston 33, into chamber 47 formed between pistons 32 and 33 and against the radially inward ends of seals 36 and 37.

In operation the apparatus shown in FIG. 3 is actuated into engagement with pipe 31 by the introduction of a pressurized hydraulic fluid through line 34 into chamber 35. This pressure in chamber 35 will cause axially opposed relative movement between pistons 32 and 33, with leftward movement of piston 32 seating slip 42 and deforming seal 36, and rightward movement of piston 33 seating slip 43 and deforming seal 37. Thereafter, a pressurized fluid may be introduced through line 45 to test the engagement of seals 36 and 37. This fluid may be an epoxy resin if a permanent connection and seal back-up is desired, as described above with reference to FIGS. 1 and 2.

Connection between housing 30 and another member may be achieved by any convenient means, as for example through the use of bias cut flange 48 secured to the open end of housing 30, as shown in FIG. 3.

This invention additionally provides a method of connecting a tubular member to another member, which method is particularly useful in joining together pipe sections and in joining a tubular construction member to another member. This method may be performed using the above described apparatus or equivalants thereof.

Referring to FIGS. 1 and 2, in this method a housing 10 having axially spaced apart annular seals 17 and 19 is slidably positioned over the end of pipe 27. Seals 17 and 19 are arranged to be radially deformable upon actuation into sealing engagement between housing 10 and pipe 27. Seals 17 and 19 may be unitary annular packing rings of the conventional design, as shown in the FIGS., or may assume any other shape suitable for radial actuation into sealing engagement with pipe 27.

Using the apparatus shown, an actuation force for seals 17 and 19 is provided by the axially opposing movement of pistons 20 and 21 caused by introduction of a pressurized hydraulic fluid into chamber 22 through valve 23. After actuation of seals 17 and 19, a pressurized fluid is thereafter injected through valve 25 into chamber 24, and then through radial openings 26 and chamber 28 to test the sealing engagement of seals 17 and 19.

If the apparatus used for performing this method also includes a gripping means such as bowl 11 and mating slidable slips 12, as shown in FIGS. 1 and 2, the method of this invention then also includes actuation of the gripping means into engagement with pipe 27. This actuation is provided, as described above, by the hydraulically generated leftward force of piston 20 as it is transmitted through seal 17 and thrust ring 16 to the right hand end of slips 12.

The method may also be performed using the apparatus shown in FIG. 3 and described above. In addition to the elements described above, this apparatus includes a second gripping means in the form of bowl 41 and mating slidable slips 43, which gripping means is actuated by the rightward movement of piston 33, as described above.

When the pressurized test fluid introduced through valve 25 shown in FIGS. 1 and 2 or through line 45 shown in FIG. 3 is a hardenable fluid, such as an epoxy resin, the method of this invention may also include maintaining a desired pressure on the hardenable fluid until the fluid has set to a rigid state.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the apparatus and method of this invention.

What is claimed is

1. In apparatus for making a connection to the end of a pipe, the combination comprising:
   a housing arranged for generally co-axially over sliding positioning over said pipe end;
   a pair of axially movable annular pistons mounted in said housing for encircling said pipe, with said pistons and housing having means thereon forming a first fluid tight annular chamber;
   a first opening through said housing and communicating with said first annular chamber, whereby a pressurized fluid may be applied to said first annular chamber to thereby urge said pistons in opposite axial directions;
   a pair axially spaced of radially deformable annular seals mounted in said housing in such a fashion that said pistons are located between said seals and said seals are arranged to seal the space between said housing and said pipe upon being axially compressed by said pistons, thereby forming a second annular fluid tight chamber therebetween and radially inward of said pistons;
   at least one plurality of tapered slips circumferentially spaced about in said housing and arranged for gripping said pipe upon actuation thereof, said slips being actuable in response to actuation of one of said seals by one of said pistons;
   said housing having a second opening for applying another pressurized fluid therethrough;
   and, one of said pistons having at least one radial port therethrough, with said port arranged for communication with said second opening and said second annular chamber after said pistons have been actuated, whereby a second pressurized fluid may be applied to said second annular chamber through said second opening and said port.

* * * * *